US012779792B2

(12) United States Patent
Terasaka

(10) Patent No.: US 12,779,792 B2
(45) Date of Patent: Nov. 3, 2026

(54) FORMING METHOD AND FORMING DEVICE

(71) Applicant: TOYOTA JIDOSHA KABUSHIKI KAISHA, Toyota (JP)

(72) Inventor: Akihiro Terasaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/001,448

(22) Filed: Dec. 25, 2024

(65) Prior Publication Data

US 2025/0242553 A1 Jul. 31, 2025

(30) Foreign Application Priority Data

Jan. 31, 2024 (JP) ................................ 2024-013563

(51) Int. Cl.
*B29C 70/34* (2006.01)
*B29C 70/44* (2006.01)
*B29D 99/00* (2010.01)

(52) U.S. Cl.
CPC .......... *B29C 70/342* (2013.01); *B29C 70/446* (2013.01); *B29D 99/0014* (2013.01)

(58) Field of Classification Search
CPC ... B29C 70/342; B29C 70/446; B29C 70/845; B29D 99/0014
See application file for complete search history.

(56) References Cited

U.S. PATENT DOCUMENTS

2021/0187463 A1 6/2021 Yamamoto et al.

FOREIGN PATENT DOCUMENTS

JP 2020-147009 A 9/2020
JP 6801913 B1 12/2020

*Primary Examiner* — Jerzi H Moreno Hernandez
(74) *Attorney, Agent, or Firm* — SoraIP, Inc.

(57) ABSTRACT

In the forming method according to the present disclosure, the shape holding jig is fixed on the first holding jig, the material sheet is attached to the shape holding jig, the material sheet and the shape holding jig are removed from the first holding jig, and the material sheet and the shape holding jig are replaced with a second holding jig having a lighter weight and a smaller heat capacity than the first holding jig, and the material sheet and the shape holding jig fixed on the second holding jig are evacuated. Further, the forming device according to the present disclosure includes a shape holding jig and a holding jig, and the holding jig includes a support mechanism capable of stacking and supporting a plurality of shape holding jigs.

2 Claims, 3 Drawing Sheets

FORMING METHOD AND FORMING DEVICE

CROSS-REFERENCE TO RELATED APPLICATION

This application claims priority to Japanese Patent Application No. 2024-013563 filed on Jan. 31, 2024, incorporated herein by reference in its entirety.

BACKGROUND

1. Technical Field

The present disclosure relates to a forming method and a forming device, and more particularly to a forming method and a forming device for a composite material.

2. Description of Related Art

Japanese Unexamined Patent Application Publication No. 2020-147009 (JP 2020-147009 A) discloses a forming jig used for heating a pre-preg sheet of composite material in an autoclave.

SUMMARY

Composite materials typified by fiber-reinforced plastics are suitably used for components such as aircraft, industrial machinery, and so forth. The composite material is formed by applying a skin (material sheet), which is mainly a plate-like member, and a stringer (longeron), which is a reinforcing material, onto a holding jig, and performing heat treatment.

As larger sizes of the composite material comes to be required, the holding jig supporting the skin and the stringer also increase in size, and heat capacity increases. Accordingly, in heat treatment of the skin and the stringer supported by the holding jig, thermal energy and forming time also increase.

The present disclosure has been made to solve such problems, and an object thereof is to provide a forming method and a forming device for a composite material, which are capable of shortening heat curing time of composite material.

A forming method according to the present disclosure includes

- fixing a shape holding jig on a first holding jig, and applying a material sheet to the shape holding jig,
- removing the material sheet and the shape holding jig from the first holding jig and reattaching to a second holding jig that is lighter in weight and of which heat capacity is smaller than the first holding jig, and
- evacuating the material sheet and the shape holding jig fixed on the second holding jig. Accordingly, a forming method can be provided that is capable of shortening the heat curing time of the composite material.

Also, following evacuating, heat treatment of the material sheet and the shape holding jig fixed on the second holding jig may be performed, and the material sheet may be separated from the shape holding jig. Thus, the heat curing time of the composite material can be shortened.

A forming device according to the present disclosure includes a shape holding jig, and a holding jig, wherein the holding jig includes a support mechanism that is configured to stack and support a plurality of the shape holding jigs. Accordingly, a forming device can be provided that is capable of shortening the heat curing time of the composite material.

Further, a chamber may be provided that accommodates the holding jig and the shape holding jigs, and that is configured to perform at least one of evacuation and heat treatment. Thus, the heat curing time of the composite material can be shortened.

According to the present disclosure, a forming method and a forming device for a composite material can be provided that are capable of shortening heat curing time of the composite material.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. FIGS. 1A to 1D are diagrams for describing the forming method according to the present embodiment.

Figure 1A:
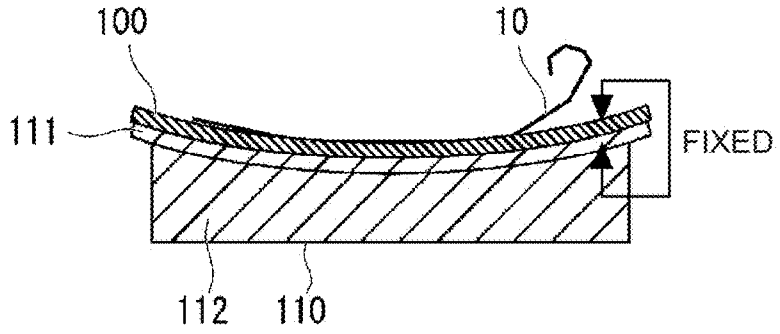
FIG. 1A is a diagram illustrating a forming method according to the present disclosure.

First, the shape holding jig 100 is fixed on the first holding jig 110, and the material sheet 10 is attached to the shape holding jig 100 (see FIG. 1A). The first holding jig 110 includes at least a stage 111 for fixing the shape holding jig 100 and a base 112 for supporting the shape holding jig 100.

Examples of the material sheet 10 include a pre-preg sheet obtained by impregnating a carbon fiber with a thermosetting resin. By performing the pressure heat treatment in a state in which the material sheet 10 is laminated, the pre-preg sheet can be adhesively cured to obtain a composite material.

The shape holding jig 100 is a sheet-like jig and is detachable from the first holding jig 110. Since the shape holding jig 100 has a sheet shape, the heat capacity can be reduced. The shape holding jig 100 is preferably made of a highly thermally conductive material such as carbon-fiber-reinforced plastic, glass-fiber-reinforced plastic, steel, SS400, aluminum, copper, or graphene. Further, since the composite material is formed after the material sheet 10 is stuck on the shape holding jig 100, it is preferable that the shape holding jig 100 has sufficient flatness.

Figure 1B:
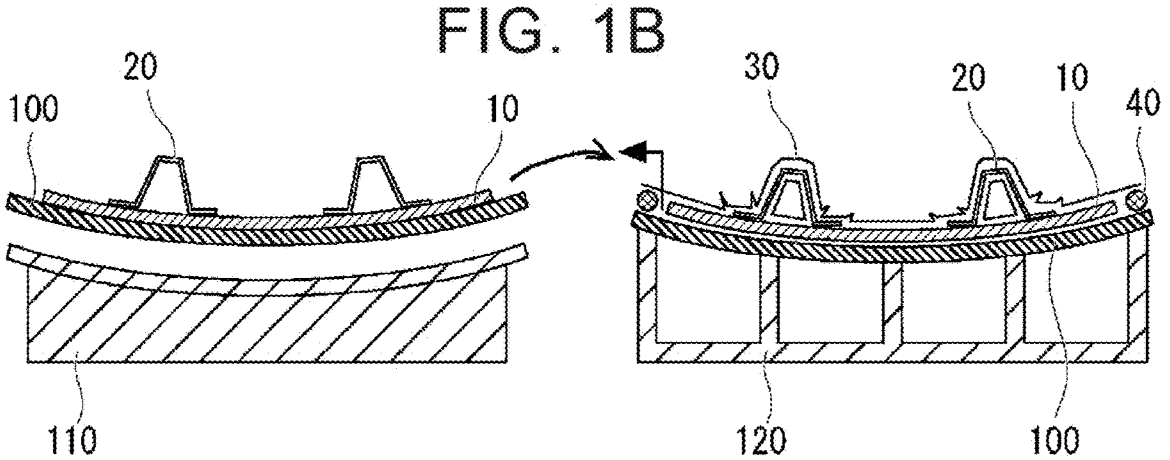
FIG. 1B is a diagram illustrating a forming method according to the present disclosure.

After the material sheet 10 is attached to the shape holding jig 100, the longeron 20 as a reinforcing material is provided on the material sheet 10, and the material sheet 10 and the shape holding jig 100 are removed from the first holding jig 110 (refer to the left-hand drawing in FIG. 1B). The longeron 20 has a role of improving the rigidity of the material sheet 10, and is provided on the surface and/or inside of the material sheet 10.

After the material sheet 10 and the shape holding jig 100 are removed from the first holding jig 110, they are replaced with and fixed to the second holding jig 120. Then, the covering member 30 is placed over the material sheet 10 and the shape holding jig 100 via the spacer 40, and evacuation is performed (see the right-hand drawing in FIG. 1B).

The second holding jig 120 is made of a material that is lighter in weight and has a smaller heat capacity than the first holding jig 110. The second holding jig 120 is preferably made of a highly thermally conductive material such as aluminum or SS400, for example. As the covering member 30, for example, a nylon film or the like is used.

The step of attaching the material sheet 10 to the shape holding jig 100 is performed by pressing the material sheet 10 against the shape holding jig 100 and the first holding jig 110 using a laminating machine (not shown). Therefore, since the first holding jig 110 needs to be large and sufficiently rigid, the weight of the first holding jig 110 becomes considerably large.

On the other hand, the second holding jig 120 is made of a material that is lighter in weight and has a smaller heat capacity than the first holding jig 110, and thus has an advantage of being easy to handle. In addition, in the step of evacuating, the second holding jig 120 is small in size and light in weight, and thus has an advantage of easy airtightness.

Figure 1C:
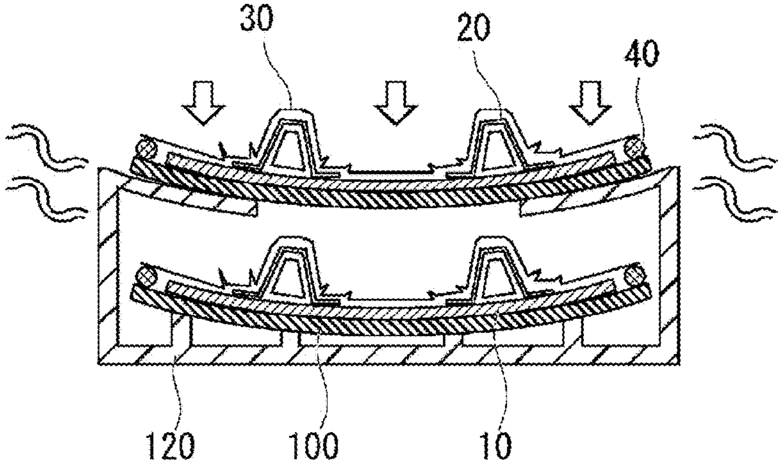
FIG. 1C is a diagram illustrating a forming method according to the present disclosure.

After the evacuation, the material sheet 10 and the shape holding jig 100 fixed on the second holding jig 120 are heat-treated to heat-cure the material sheet 10 (see FIG. 1C). Since the second holding jig 120 is made of a material having a small heat capacity, heat treatment of the material sheet 10 can be efficiently performed.

Figure 1D:
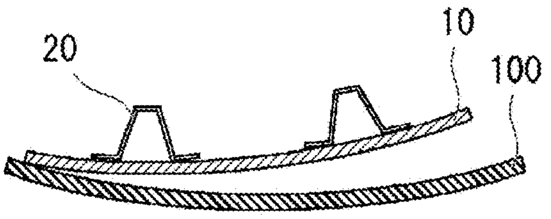
FIG. 1D is a diagram illustrating a forming method according to the present disclosure.

Thereafter, the heat-cured material sheet 10 is separated from the shape holding jig 100 to obtain a composite material in which the material sheet 10 and the longeron 20 are integrated (see FIG. 1D).

Next, a forming method, which is a comparative example of the forming method according to the present disclosure, will be described with reference to FIGS. 2A to 2D. Note that the same reference numerals are given to the same elements in FIGS. 1A to 1D, and redundant explanations thereof will be omitted.

The forming method shown in FIGS. 2A to 2D is a method in which the material sheet 10 is directly adhered to the stage 131 included in the forming jig 130 without using the second holding jig 120 to obtain a composite material.

Figure 2A:
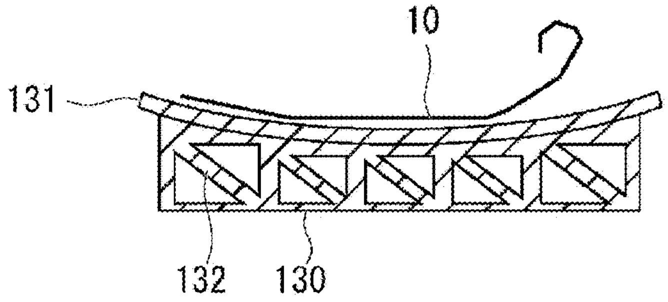
FIG. 2A is a diagram illustrating a related forming method.

First, the material sheet 10 is stuck on the forming jig 130 (see FIG. 2A). The forming jig 130 includes at least a stage 131 and a base 132.

The step of attaching the material sheet 10 to the forming jig 130 is performed by pressing the material sheet 10 against the forming jig 130 using a laminating machine (not shown). Therefore, since the forming jig 130 needs to be large and sufficiently rigid, the weight of the forming jig 130 becomes considerably large.

Figure 2B:
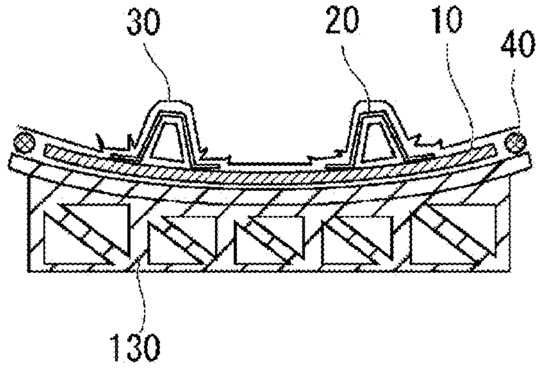
FIG. 2B is a diagram illustrating a related forming method.

After the material sheet 10 is stuck to the forming jig 130, the longeron 20 is provided on the material sheet 10, the covering member 30 through the spacer 40 is covered with the material sheet 10, perform evacuation (see FIG. 2B). In the forming method using the forming jig 130, since the forming jig 130 is airtight, costs such as airtight welding are required.

Figure 2C:
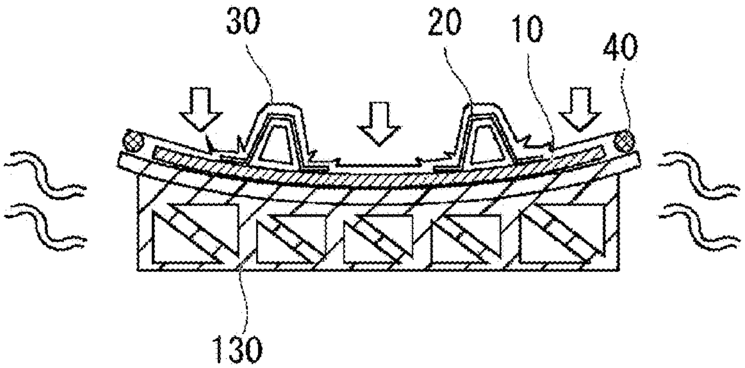
FIG. 2C is a diagram illustrating a related forming method.
Figure 2D:
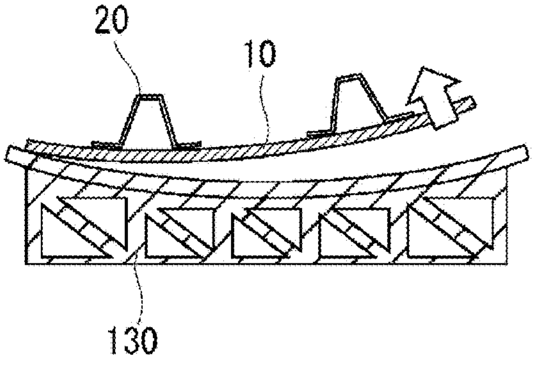
FIG. 2D is a diagram illustrating a related forming method.

After evacuating, the material sheet 10 fixed on the forming jig 130 is heat-treated to heat-cure the material sheet 10 (see FIG. 2C). Thereafter, the heat-cured material sheet 10 is separated from the forming jig 130 to obtain a composite material in which the material sheet 10 and the longeron 20 are integrated (see FIG. 2D).

Since the forming jig 130 is heavy and has a large heat capacity, most of the heat energy required for the heat treatment of the material sheet 10 is consumed in the forming jig 130. In addition, since the heating furnace that houses the forming jig 130 also needs a high load bearing capacity and a high heating capacity, productivity is low.

Further, the forming jig 130 cannot perform other processes until the material sheet 10 is separated. On the other hand, in the forming method according to the present disclosure, after the material sheet 10 and the shape holding jig 100 are removed from the first holding jig 110, the first holding jig 110 can be used in another process, and thus high productivity can be realized.

Figure 3:
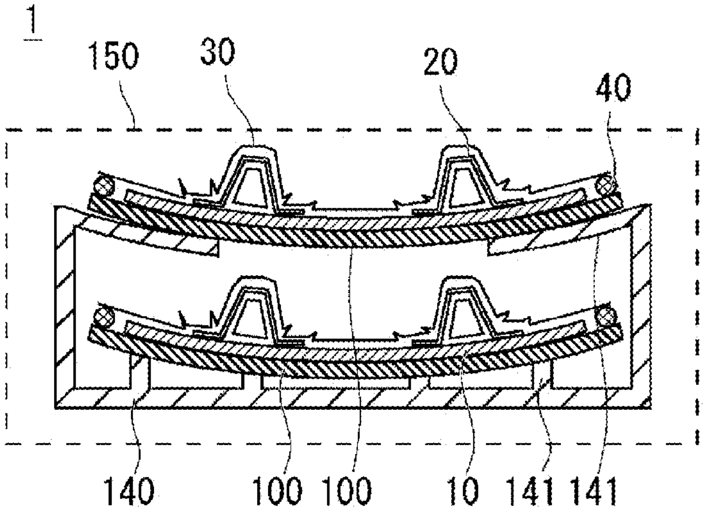
FIG. 3 is a diagram illustrating an example of a forming device according to the present disclosure.

Next, the forming device 1 according to the present disclosure will be described with reference to FIG. 3. The forming device 1 includes a holding jig 140, and the holding jig 140 includes a support mechanism 141 capable of stacking and supporting a plurality of shape holding jigs 100. With such a configuration, a plurality of composite materials can be formed at once.

In addition, the forming device 1 may include a chamber 150 that houses the holding jig 140 and the plurality of shape holding jigs 100 and can perform evacuation and/or heat treatment.

In this way, to provide a forming method and a forming device of the composite material capable of shortening the heat curing time of the material of the composite.

The present disclosure is not limited to the above-described embodiments, and can be appropriately modified without departing from the scope of the present disclosure.

What is claimed is:

1. A forming method comprising:

fixing a shape holding jig on a first holding jig, and applying a material sheet to the shape holding jig;

removing the material sheet and the shape holding jig from the first holding jig and reattaching to a second holding jig that is lighter in weight and of which heat capacity is smaller than the first holding jig; and evacuating the material sheet and the shape holding jig fixed on the second holding jig.

2. The forming method according to claim 1, further comprising:

following evacuating, performing heat treatment of the material sheet and the shape holding jig fixed on the second holding jig; and separating the material sheet from the shape holding jig.

* * * * *